United States Patent [19]

Taylor

[11] Patent Number: 5,890,526

[45] Date of Patent: Apr. 6, 1999

[54] DRIVER FOR BEAD SEAT BAND

[76] Inventor: Brent L. Taylor, 2906 S. 24th St., Quincy, Ill. 62301

[21] Appl. No.: 932,120

[22] Filed: Sep. 17, 1997

[51] Int. Cl.⁶ ..................................................... B60B 25/14
[52] U.S. Cl. ........................................... 152/410; 152/406
[58] Field of Search .................................... 152/402, 406, 152/407, 408, 409, 410; 301/10.1, 35.3

[56] References Cited

U.S. PATENT DOCUMENTS

| | | | |
|---|---|---|---|
| 1,403,777 | 1/1922 | Hegar | 152/406 |
| 1,539,317 | 5/1925 | Johnson | 152/406 |
| 3,003,538 | 10/1961 | Gerbeth | 152/405 |
| 3,106,237 | 10/1963 | Holmes . | |
| 3,224,484 | 12/1965 | Smith . | |
| 3,459,252 | 8/1969 | Verdier . | |
| 3,599,698 | 8/1971 | Skehan | 152/410 |
| 4,116,489 | 9/1978 | Walther | 152/410 X |
| 4,144,922 | 3/1979 | Strader . | |

*Primary Examiner*—Russell D. Stormer
*Attorney, Agent, or Firm*—Joseph W. Holloway

[57] ABSTRACT

An elongated driver block having a radially extending crown and a radially extending toe is insertable between the confronting end surfaces of a split lock ring.

15 Claims, 1 Drawing Sheet

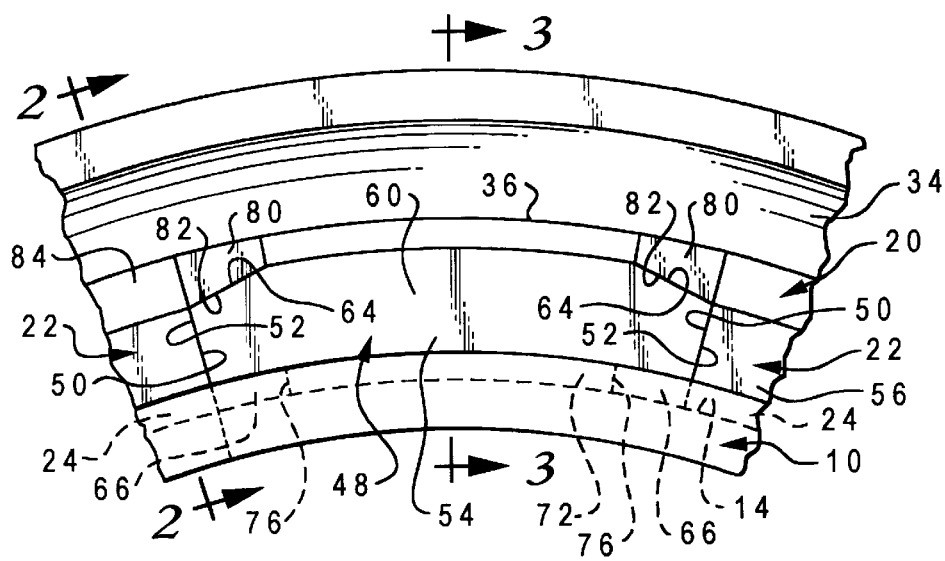
Fig. 1
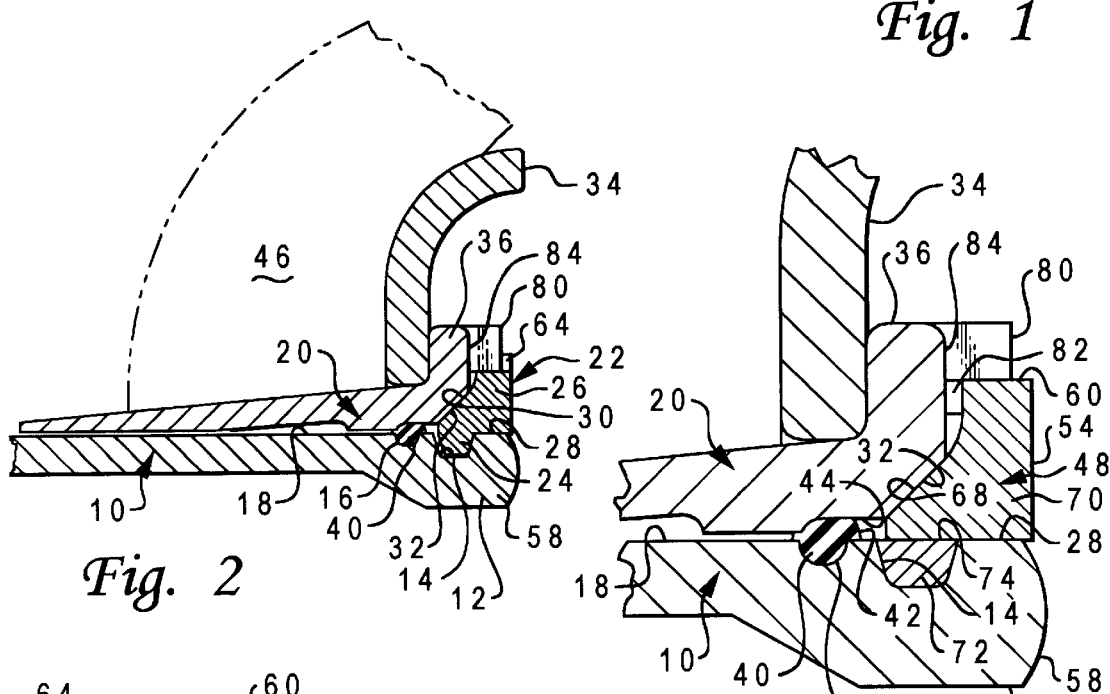
Fig. 2
Fig. 3
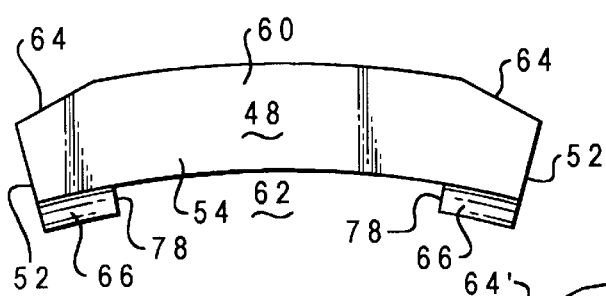
Fig. 4
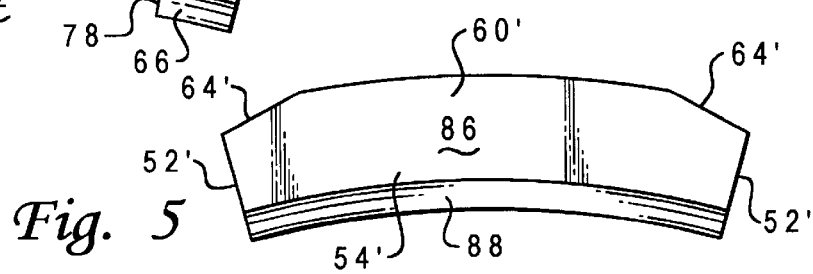
Fig. 5

DRIVER FOR BEAD SEAT BAND

BACKGROUND OF THE INVENTION

This invention relates broadly to wheels of the type which employ multipiece rims to facilitate tire mounting and demounting in a manner well known to those involved with the manufacture, use and maintenance of large-diameter wheels for earthmovers, loaders, mine haulage trucks, farm tractors and other off-road vehicles. The standard structural components of such rims and their functions are well understood and need not be described in detail; however, to illustrate the general nature of the present invention, it should be indicated that such rims typically include: a cylindrical rim base, a conical bead seat band, a flared flange ring at each end of the base, an O-ring gasket and a lock ring of the split type. The bead seat band slides axially over the gutter end of the base and has a radially upstanding end wall which abuts with an adjacent flange ring. When the rim parts are assembled, the lock ring is partially recessed radially in a groove formed about the gutter end of the base; and, a beveled side wall of the lock ring is engaged by a reversely sloped surface of the bead seat band. As the tire is pressurized, the flange which engages the bead seat band presses the latter axially against the lock ring causing the ring to wedge axially outwardly and radially inwardly with respect to its receptive groove in the base. So long as inflationary pressure acts upon the flange, bead seat band and lock ring with sufficient force, frictional engagement with the intermediate lock ring will alone provide a non-slip driving interconnection between the base and bead seat band.

As the size of many vehicles and their load capacities have grown, torques acting on the wheel rim and the rubber tires mounted thereon have increased proportionately. In fact, so great are the driving and breaking torques encountered in the normal operation of many contemporary large-wheeled vehicles that angular slippage almost always occurs between the bead seat band and the rim unless the afore-described frictional engagement between various rim parts is augmented by positive, structural interengagement of these parts. The problems caused by bead seat band slippage relative to the rim base are fully appreciated by equipment owners, operators and maintenance personnel; and, principal among these problems are degradation of equipment performance, severe tire distortion resulting in the rapid destruction of the tire beads and walls, and, in tubeless tire applications, complete failure of the O-ring air sealing gasket captured between the rim and the bead seat band. Should an O-ring gasket be destroyed or displaced, tubeless tires will quickly deflate leading to possible damage or destruction of the tire and, perhaps, the rim as well. Substantial expenses are always encountered in servicing and repairing the tires and rims of large vehicles, particularly in the field or underground; and, costly equipment down time and lost time for operating personnel can be expected.

Many inventions intended to remedy some of the aforenoted problems arising from rim to bead seat band slippage have been devised; and, several have been patented in this country. One type of device employed for structurally interconnecting the bead seat band to the ring is disclosed in early U.S. Pat. No. 3,003,533 issued to Gerbeth wherein a cross-shaped torque transmitting driving key has one projecting arm inserted in a pocket defined by a C-shaped lug welded to the periphery of the base at its gutter end; and, such key has another oppositely projecting arm loosely captured in an axially notched member welded to the upstanding peripheral wall of the bead seat band. U.S. Pat. No. 3,599,697 issued to Gerbeth and U.S. Pat. No. 5,107,914 issued to Yamoto et al disclose useful changes in the configuration of certain driver components intended to reduce welding-induced stress concentrations in the bead seat band and to close certain clearances between interfitting parts of Gerbeth's loose key driver. Not withstanding the continued popularity of the Gerbeth '538 driver, notable problems remain, namely:

The axially projecting pocket members and coacting loose key are extremely vulnerable to accidental impacting and damage on the job.

The substantial clearances between parts originally intended to render the Gerbeth type driver easy to assemble and disassemble, in fact, invite the entrance of cement-like detritus and corrosion which may so adhere the parts that they must be destructively removed and thereafter replaced each time the rim parts are disassembled.

The loose tolerances designed into the '538 pocket-key device allows the key to cock and thereafter to produce localized areas of line driving contact whereby the driver components suffer early and rapid wearing leading to such structural and operational debilitation of the driver that deleterious slippage between the rim and the bead seat band can occur even if the driver key remains in place.

U.S. Pat. No. 3,106,237 to Holmes, U.S. Pat. No. 3,224,484 to Smith and U.S. Pat. No. 4,144,922 to Strader suggest that the lock ring be utilized to help alleviate the aforenoted problems created by the use of Gerbeth's loose key as a bead seat band driver. To this end, Holmes rabbets the split ends of his lock ring to receive and retain a loose key axially and radially in angularly aligned slots in the rim and in a flange ring fixed to the bead seat band, whereby the rim and flange ring are interlocked. Smith welds an axially projecting, T-shaped key to the axial outboard side of his lock ring. One arm of Smith's key interfits with a slot in the extreme axial end face of the rim and the other key arm interfits in a slotted lug welded to the outboard end of the bead seat band. Strader welds a pair of angularly spaced lugs to his lock ring and a T-shaped key is welded to the upright surface of a flange fixed to his bead seat band. Upon tire inflation, these lugs are interfittably received in angularly aligned slots in the outboard end of the rim; and, the upright leg of the T-shaped key is captured between the confronting lock ring surfaces defining the split or gap therein. In this fashion, the lugs, the lock ring and the T-shaped key provide an interconnected driving structure between Strader's rim and bead seat band.

In comparison with the previously discussed Gerbeth '538 loose key driver, Holmes, Smith and Strader reduce troublesome axial projection of driver components thereby protecting driver components from inadvertent battering and breaking. Furthermore, closer driving fits between the lock ring of each of the three drivers just discussed and the various lugs and key connecting these lock rings to their rims or to their bead seat bands provide superior angular alignment and less play between parts thereby reducing wearing of rim components. However, each of these structures requires that the extreme axial end of the rim be notched or otherwise cut away to receive some sort of lug projecting radially from the lock ring. Because such a notch comprises a structural discontinuity which localizes torque induced stresses in the notched area, cracks in the hub can occur through the notch. Even if a hub crack is minute, inflationary air will escape through the rim and troublesome and costly tire deflation will eventually result. In accordance with industry practice, inclusion of a notched base in a wheel assembly dictates a reduced maximum air pressure rating for such assembly. It will be noted that Strader has welded two lugs to his lock ring and has notched his rim at two angularly spaced points in order to divide shear forces on the order of 8000 pounds per square inch that are commonly generated by the wheel driving torque applied to the lock ring of large diameter rims. However, such plural notches in the rim base are apt to increase proportionally the risk of stress concentrations leading to rim failure. Not only must Holmes notch his rim as do Smith and Strader, but Holmes is required to cut notches in his flange ring and in his lock ring in order to connect all three of these parts by means of his loose key.

U.S. Pat. No. 3,459,252 issued to Verdier describes a driver for a bead seat band which is structurally distinguishable from the abovedescribed prior art drivers in these two significant regards:

Firstly, the driving connection between the lock ring and the rim base is accomplished without slotting or otherwise structurally degrading either the rim base or the lock ring. Instead, a stop key is fixed in the lock ring groove by welding or otherwise and projects radially outwardly intermediate the spaced ends of a split lock ring to prevent slippage of the lock ring after one or the other of its end surfaces abuts the stop key.

Secondly, the driving connection between the lock ring and the bead seat band includes cams welded to the outboard surface of the lock ring proximate each each side of the gap therein.

It is evident that by placing a stop key in the lock ring groove, Verdier has provided a simple device for positively driving his lock ring which is not exposed to accidental battering, as in the Gerbeth driver, and which does not require notching the rim base, as do all of the Holmes, Smith and Strader drivers. However, Verdier's requirement that the stop key be sized for acceptance in the usual narrow gap in a lock ring creates the following inherent shortcomings for this class of driver:

Although the normally narrow gap in the lock ring could be greatly enlarged for the sole purpose of providing space for a larger, stronger stop key, this modification alone would create a substantial risk that, under inflationary pressure, an exposed O-ring segment of accordingly greater arcuate length would be extruded outwardly through such an oversized gap.

Use of the lock ring gap to receive the stop key in accordance with the Verdier patent also dictates that the lock ring have discrete load-bearing lugs or the like welded thereto on both sides of the gap for engaging and driving the bead seat band in opposed directions. Such weldments create modified lock ring segments having increased thickness and undesirable stiffness, as well as heat affected sections which are likely to exhibit localized degradation of desirable metallurgical properties established by careful selection of alloyed material and by previous heat treatment.

SUMMARY OF THE INVENTION

The general object of this invention is to provide an improved driver for a bead seat band which overcomes the aforedescribed shortcomings of prior art drivers intended for the same purpose.

More particularly, this invention contemplates a bead seat band driver which provides a rotative coupling between the base of a rim and a bead seat band by means of a removable member fitted between the split ends of the lock ring. This driver member, which is discrete from the lock ring, comprises an elongated, arcuate block or lug which has the same general cross-sectional configuration as the lock ring thereby enabling it to be wedged between the rim base and the bead seat band in generally the same manner as the lock ring.

In a first embodiment depicted in FIGS. 1 to 4, a hook or toe portion of the block which projects into the lock ring groove has a keyway intermediate its ends for receiving a key fixed in the lock ring groove thereby providing a positive structural means for preventing angular displacement between the rim and block. In certain applications of the driver block to be hereinafter described, a modified construction, depicted in FIG. 5, provides advantageous results while eliminating the key and keyway connection between the rim base and the driver block.

Regardless of which driver embodiment is utilized, the lock ring is restrained against rotation with respect to the driver by the abutment of the split end surfaces of the lock ring with the terminal end surfaces of the block. The one-piece driver block has a radially outwardly projecting portion which includes converging cam surfaces which slope to the opposite ends of the block. The extreme end surfaces of the block are congruent with the split end surfaces of the lock ring. The driving connection between the block and the bead seat band is provided by two sets of complementary cams. One cam of each set is formed on the perimeter of the driver block and the other cam of each set is fixed to and projects from the upstanding outboard surface of the bead seat band. Angular slippage of the bead seat band in either direction relative to a lock ring will cause the surfaces of the cams of one set or the other to engage thereby arresting such slippage in part by the abutment of the lock ring against the stop key and in part by radially acting forces created by the engagement of the cam surfaces which aid the bead seat band in compressing the lock ring in its groove.

The driver block construction, according to this invention, alleviates the aforenoted shortcomings of the Verdier device in the following regards:

Since the arcuate length of the separable driver block may be increased as required to fit any selectably lengthened gap in the lock ring, a keyway cut in the block can be beneficially lengthened to accept a longer key whereby a weldment of increased size and strength can be utilized to provide a more secure attachment of the key with the lock ring groove.

Even where a wide lock ring gap is provided to afford a wider keyway and strengthened attachment of the key to the base, the O-ring will not extrude axially through the gap, as is the case with Verdier, because the gap is completely occupied by the block. Conversely, a correspondingly more substantial arcuate portion of the O-ring would be exposed should the driver block be inadvertently omitted during assembly of the rim. Thereafter, should a serviceman attempt to inflate a tire mounted on a rim with the driver block missing, the O-ring will push out harmlessly through the gap before substantial tire pressurization can occur.

Because the crown of the driver block can be provided with a complementary set of cams required to coact with the cams carried by the bead seat band, the preselected strength and stiffness characteristics of the lock ring need not be degraded by welding cam blocks to the lock ring in the manner disclosed in the Verdier patent.

A further object of this invention is to provide alternate embodiments of a driving block which have these additional favorable attributes:

both driver blocks can be produced by casting or forging and require only a minimum of additional operations to provide a required keyway and various load bearing surfaces. Moreover, the metallurigical specifications of the blocks need not be the same as those of the lock ring; therefore, the blocks can usually be made of less costly material and do not require additional heat treatment.

Since the driver block comprises a rugged, one-piece member whose outboard surface registers with that of the lock ring, no part of the driver structure protrudes axially beyond the lock ring or the rim thereby greatly reducing the risks of damaging the driver on the job. However, should the driver block be damaged during operation of a vehicle or during assembly or disassembly of the lock ring, it can be more cheaply replaced than a lock ring having driver components welded thereto.

Because the driver block is inserted in line with the confronting ends of the lock ring, there are no substantial spaces between these parts which would allow muck, rocks and other detritus to enter.

The projecting crowned midsection of the block has an important secondary function beyond providing a pair of oppositely facing cam surfaces, namely, the additional material in the midsection compensates for any loss of strength and mass in the driver block where material is removed to form a keyway.

Inasmuch as the present driver constructions serve to connect the rim base to the bead seat band yet do not require the lock ring itself to transmit more than its usual share of driving or braking torque, these drivers function without subjecting the lock ring to forces tending to stress the lock ring and to shift it in its groove with attendant wearing.

These and other objects and advantageous features of the invention will become apparent and the invention will be best understood and fully appreciated by having reference to the following detailed description of preferred embodiments of the invention taken in conjunction with the accompanying drawings.

DESCRIPTION OF THE DRAWINGS

FIG. 1 is an elevational view of an outboard segment of a multipiece rim constructed in accordance with this invention;

FIG. 2 is a fragmentary section taken along lines 2—2 of FIG. 1 showing a portion of a mounted tire in phantom lines;

FIG. 3 is an enlarged fragmentary section taken along lines 3—3 of FIG. 1; and,

FIG. 4 is an elevational view of a driver block which has been disassembled from the other rim parts; and FIG. 5 is a view similar to FIG. 4, showing a modified driver block.

DETAILED DESCRIPTION OF THE INVENTION

The multipiece rim illustrated in the drawings typically comprises a cylindrical rim base 10 including a gutter end 12 which has circumferential grooves 14 and 16 formed in its outer surface 18. An encircling bead seat band, indicated generally by numeral 20, slips telescopically over the gutter end 12 of the base and is held in position axially by a split lock ring 22. The lock ring includes a radially extending hook or toe portion 24 configured for engagement with the groove 14 and an annular heel 26 which seats on a corresponding annular surface 28 of the base 10. A beveled inboard surface 30 of the lock ring engages a reversely beveled surface 32 of a bead seat band 20; and, a rim flange 34 engages the outwardly extending flanged portion 36 of the bead seat band 20. As best seen in FIG. 3, the O-ring gasket 40 embraces the rim 10 within the groove 16 and is axially and radially distorted between confronting surfaces 42 and 44 of the base 10 and bead seat band, respectively. Radial compression of the O-ring between these confronting surfaces and the air pressure within a tubeless tire mounted on the rim tend to extrude the O-ring between the surfaces whereupon the O-ring acts to seal the annular passageway between the surfaces 42 and 44 to maintain inflationary air pressure inside the tire. A fragment of a bead and wall portion of a tire 46 is depicted in phantom lines in FIG. 2. As thus for disclosed, the rim construction is entirely conventional and is commercially available.

One embodiment of a unitary driver block contemplated by this invention is shown in FIGS. 1 to 4 of the drawings and is designated in its entirety by numeral 48. As best illustrated in FIG. 1, when the rim parts are fully assembled, the driver is disposed in and is substantially contained in the gap defined by the split end surfaces 50, 50 of the lock ring 22. The opposed extreme end faces 52, 52 of the driver and the confronting lock ring surfaces 50, 50 generally have like configurations and dimensions. The outboard surface 54 of the driver and the outboard surface 56 of the lock ring are generally flush with one another; and, it is preferred that neither the lock ring nor the driver block protrudes axially beyond the outboard rim surface 58. For a purpose to be described herein, block 48 includes an arcuate crown 60 which projects radially outwardly and an elongated arcuate slot or keyway 62 in its bottom which opens radially inwardly to the lock ring groove 14. As best seen in FIGS. 1 and 4, the crown 60 and the slot 62 are of substantially the same arcuate length. Preferably, the projecting crown 60 bias radially converging cam surfaces 64, 64 which converge toward one another and slope to and intersect with the opposed end surfaces 52, 52 of the block 48. The keyway 62 is formed opposite crown 60 by removal of a medial portion of the toe or hook 66 which projects radially into the lock ring groove 14. As best seen in FIG. 3, the beveled inboard surface 68 of the block 48 engages the reversely beveled surface 30 of the bead seat band 20, and the heel 70 of the block rests upon the annular surface 28 of the base 10.

In the embodiment shown in FIGS. 1 to 4, an arcuately elongated stop key 72 is welded to, deposited in, or otherwise suitably formed in the lock ring groove 14 of base 10. The key surface 74 is generally flush with adjacent surfaces 28 and 42 of the gutter end 12 of rim base 10; and, the key has walls 76, 76 defining its opposed ends. The keyway 62 subtends an arc which is only slightly greater than that of the stop key 72 so that the key can be freely inserted and removed with respect to the keyway 62 but without excessive looseness between the key end walls 76, 76 and the confronting end walls 78, 78 of the keyway.

An important feature of this invention is the provision of a stop key 72 having sufficient arcuate length to overlie and contact a substantial area of the base 10 thereby affording a strong connection between the key and the surface of the lock ring groove as a result of either welding a discrete key in the groove or depositing weld material in the groove to form the key. To this end, the dimension of the lock ring gap which receives block 48 is substantially wider than the width that would normally be required merely to manipulate the lock ring hook 24 into groove 14 in the base 10. With the gap so increased, the length of the driver can be extended and the keyway 62 can be lengthened accordingly to accept the lengthened key 72. For example rims having diameters of sixty inches or more might be equipped with driver blocks nine inches or more in length. Interfitting keys 72 for driver blocks of this size have been fixed to the rims by means of weldments having sufficient length and strength to resist fractures and separations in the weld area despite the very high shearing stresses and impacting which such weldments must withstand. From the foregoing description, it will be appreciated that the appropriate width of any lock ring gap will be determined principally by the magnitude of the forces acting on the key 72. Thus, the gap must be wide enough to accept a driver block 48 which has a keyway 62 of sufficient length to receive an interfitting key 72 dimensioned for sufficient contact with base 10 to assure a good connection therebetween by welding or some like means of attachment.

A pair of angularly spaced cam lugs 80, 80 having cam surfaces 82, 82 that are complementary in size and slope to the cam surfaces 64, 64 are welded or otherwise fixed to the outboard wall 84 of flange 36 on the bead seat band 20. As will be more fully explained, driving and braking forces applied to rim 10 are coupled to the bead seat band 20 by the compressive engagement of the driver block cam surface 64, 64 with the cam lug surfaces 82,.82.

The length of the complementary cam surfaces 64, 64 82, 82 and their slope with respect to the radius of the rim 10 may be modified as desired to alter the dimensions and geometry of the block crown 60 and the lugs 80. Likewise, the radially acting component of the force imparted to the driver block 48 by the coaction of cams may be selectively varied to increase substantially the wedging action of the toe of block 48 against the wall of the O-ring groove by an appropriate alteration of the slope of the complementary cam surfaces. If such increased wedging of the driver block 48 supplements the usual frictional connection between the lock ring 22 to the rim base 10 to such an extent that slippage therebetween no longer occurs, a modification of the rim construction disclosed above becomes possible and desirable. Namely, the driver block 48 may be modified in the manner of block 86 depicted in FIG. 5 to further simplify its construction and reduce its already low cost of manufacture. Modified block 86 has a crown 60', cam surfaces 64', 64' end faces 52', 52' and outboard surface 54'; however, block 86 has no keyway in its hook or toe 88; instead, it is continuous along the entire arcuate length of the modified block. When the keyway 62 is not required, the interconnecting key 72 can also be eliminated further simplifying the rim base construction. All other structural features of the rim assembly, including details of driver block 86, remain unchanged.

OPERATION OF THE INVENTION

For the most part, the assembly of the multipiece rim depicted in the drawings is conventional and well understood. A flange, not shown, which is identical to flange 34 is reversely turned and positioned at the end of the rim base opposite the gutter section 12. The tire 46, flange 34 and bead seat band 20 are then placed on the rim and moved axially away from the gutter section 12 sufficiently to permit installation of the elastic O-ring gasket 40 in groove 16 and the lock ring 22 in groove 14. When the driver block 48 is utilized, the lock ring 22 is seated in the groove 14 with the key 72 centrally located in the lock ring gap; and, the block 48 is inserted between the split end walls 50, 50 of the lock ring 22 to seat the key 72 in the keyway 62 with the bifurcated hook portions 66, 66 of the block seated in the lock ring groove 14. When the simplified driver block 86 is employed, the angular orientation of the lock ring 22 in its groove 14 is not critical.

With the bead seat band 20 positioned on the rim base 10 so that the projecting lugs 80, 80 are angularly aligned with the beveled ends 64, 64 of the crown 60, air pressure is gradually applied to the tire which causes the tire beads to begin to separate axially and to press against the flange 34 thereby sliding the bead seat band 20 along the rim base toward the axially fixed lock ring 22. Before the beveled surfaces 30 and 32 of the lock ring and the bead seat band, respectively, engage, the lugs 80, 80 on the bead seat band will axially override the beveled ends of the crown 60 so that the complementary cam surfaces of the lugs and the crown are aligned in confronting relationship. After the tire is inflated sufficiently to check that the lugs 80, 80 will correctly mesh with the ends 64, 64 of the crown 60, final pressurization of the tire axially compresses flange 34, bead seat band 20, lock ring 22, and rim base 10 together in their fully assembled condition.

when a wheel employing the rim construction described herein is put in service and subjected to driving and braking torques tending to produce circumferential slippage in either direction between the bead seat band 20 and the base 10, such slippage will be arrested by compressive engagement of one or the other pairs of beveled surfaces 64 and 82. Such engagement of cam surfaces locks the bead seat band 20 to the driver block 48 which, in the FIGS. 1–4 embodiment, is locked to the rim base 10 by the interfering engagement of the stop key 72 and the keyway 62. It will also be seen that, should either cam lug 80 angularly override an underlying cam surface 64 on the crown 60 of either driver 48 or 86, the overridden toe portion 66 or 88 of such driver will be radially compressed in the lock ring groove to produce supplemental frictional forces resisting unwanted rotation between the driver and the base 10. Therefore, it will be appreciated that the disposition of either of the driver blocks 48 or 86 in the lock ring groove 14 will not interfere with the usual compressive engagement of the lock ring toe 24 against the confronting wall of groove 14 to position the lock ring 22 axially with respect to the rim base 10 and to provide frictional resistance to angular slippage of the lock in its receptive groove.

In accordance with this invention, the O-ring gasket 40 will not be extruded through the gap in lock ring 22 even should the length of such gap be much greater than normal. Instead, the key 72 and the adjacent portions 66, 66 of toe portion of driver block 48 and the beveled inboard wall 68 of the driver block coact to provide a barrier which confronts the O-ring 40 and blocks the outlet of the annular passageway between surfaces 42 and 44. Likewise, the modified driver block 86 provides a continuous barrier which prevents extrusion of the O-ring 40. However, if the selected driver block 48 or 86 is absent from the lock ring gap when an attempt is made to inflate tire 46, inflationary air pressure will likely expel a long segment of O-ring 40 axially out of the groove 16, through the passageway between surfaces 42 and 44, and into the vacant lock ring gap. With the O-ring so displaced, the tire cannot be inflated unless the missing driver block is properly assembled.

While the driving mechanism disclosed herein has particular utility with a tubeless tire, it can be used to similar advantage with a tire having a tube.

The foregoing description of the embodiment of the invention shown in the drawings is illustrative and explanatory only; and, various changes in size, shape, materials, and methods as well as the specific details of the illustrated construction, may be made without departing from the scope of the invention. For example, the angularity and length of the abutting surfaces 64, 64 and 82, 82 can be varied and the radial projection of the midsection of a driver can be modified as required. Therefore, I do not intend to limited to the structure and operation shown and described herein, but intend to cover all changes and modifications which are encompassed by the scope and spirit of the appended claims.

What I claim as my invention is:

1. A multipiece wheel rim, including,
   a) a cylindrical base having a circumferential groove wherein a key is fixed;
   b) a bead seat band circling said base and providing first cam means;
   c) a split lock ring having a transverse gap and said ring being compressed in said groove by said band; and,
   d) means providing a rotative coupling between said base and said band, comprising:
      1) a driver member compressed in said groove within said gap by said band;
      2) said driver member providing a keyway which receives said key; and,
      3) said driver member providing second cam means in substantial radial and axial alignment with said first cam means.

2. The rim set forth in claim 1, wherein:
said driver member comprises an arcuate elongated block having extreme end surfaces disposed face to face with transverse surfaces defining said gap in said lock ring.

3. The rim set forth in claim 2, wherein:
said driver member is substantially contained in said gap.

4. The rim set forth in claim 2, wherein:
said driver member completely occupies said gap.

5. The rim set forth in claim 2, wherein:
said end surfaces are congruent with said transverse surfaces.

6. The rim set forth in claim 2, wherein:
said block includes a radially outwardly extending crown having converging surfaces which provide said second cam means.

7. The rim set forth in claim 1, wherein:
said first cam means comprise arcuately spaced lugs projecting axially outwardly from the outboard surface of said band;
said driver member includes a medial crown which projects radially between said lugs; and,
said first and second cam means comprise complementary sloping surfaces on said lugs and said crown, respectively.

8. The rim set forth in claim 1, wherein:
said opens radially inwardly to said groove to receive said key therein.

9. The rim set forth in claim 1, wherein:
said driver member includes a projecting toe which is compressed in said groove; and,
said toe is bifurcated by said keyway.

10. The rim set forth in claim 9, wherein:
cross sections taken transversely through bifurcated portions of said toe and through said lock ring are congruent.

11. The rim set forth in claim 1, wherein:
said driver member includes a sloped inboard surface which is engaged by said band to wedge said driver member in said groove.

12. A driver for a multipiece wheel rim, comprising:
an unitary block;
said block having a first radially extending portion for compressive engagement with said rim; and,
said block having a second radially extending portion projecting oppositely from said first radially extending portion and having oppositely facing cam surfaces formed thereon and said surfaces slope and converge toward each other.

13. The driver set forth in claim 12, wherein:
said second radially extending portion of said block includes an arcuate crown;
said first radially extending portion of said block has a slot therein opposite said crown; and,
said crown and said slot are of substantially the same arcuate length.

14. A driver for a multipiece wheel rim, comprising:
an elongated unitary block;
said block having a first radially extending portion for compressive engagement with said rim;
said block having a second radially extending portion projecting oppositely from said first radially extending portion and having oppositely facing cam surfaces formed thereon;
said cam surfaces converge toward one another;
said block has end surfaces; and, each of said converging cam surfaces intersects with one of said end surfaces.

15. The driver set forth in claim 4, wherein:
said first radially extending portion is bifurcated by an elongated medial slot.

* * * * *